US011764425B2

United States Patent
Cho et al.

(10) Patent No.: US 11,764,425 B2
(45) Date of Patent: Sep. 19, 2023

(54) BATTERY MODULE, BATTERY PACK INCLUDING SAME BATTERY MODULE, AND VEHICLE INCLUDING SAME BATTERY PACK

(71) Applicant: LG Chem, Ltd., Seoul (KR)

(72) Inventors: Yong-Jin Cho, Daejeon (KR); Jun-Kyu Park, Daejeon (KR); Jun-Yeob Seong, Daejeon (KR)

(73) Assignee: LG Energy Solution, Ltd.

( * ) Notice: Subject to any disclaimer, the term of this patent is extended or adjusted under 35 U.S.C. 154(b) by 53 days.

(21) Appl. No.: 16/651,169

(22) PCT Filed: Feb. 26, 2019

(86) PCT No.: PCT/KR2019/002331
§ 371 (c)(1),
(2) Date: Mar. 26, 2020

(87) PCT Pub. No.: WO2019/208922
PCT Pub. Date: Oct. 31, 2019

(65) Prior Publication Data
US 2020/0243936 A1    Jul. 30, 2020

(30) Foreign Application Priority Data

Apr. 25, 2018 (KR) .................. 10-2018-0047843

(51) Int. Cl.
*H01M 10/6557* (2014.01)
*H01M 10/613* (2014.01)
(Continued)

(52) U.S. Cl.
CPC ..... *H01M 10/6557* (2015.04); *H01M 10/613* (2015.04); *H01M 10/625* (2015.04);
(Continued)

(58) Field of Classification Search
CPC .......... H01M 10/6557; H01M 10/613; H01M 10/625; H01M 50/24
See application file for complete search history.

(56) References Cited

U.S. PATENT DOCUMENTS

2007/0194757 A1    8/2007 Yoon et al.
2012/0121944 A1*   5/2012 Yamamoto .......... H01M 50/103
                                                          429/7
(Continued)

FOREIGN PATENT DOCUMENTS

CN    103518274 A      1/2014
CN    205159465 U  *   4/2016
(Continued)

OTHER PUBLICATIONS

Extended European Search Report including Written Opinion dated Dec. 21, 2020 for Application No. 19792407.9, 7 pages.
(Continued)

Primary Examiner — Jonathan G Jelsma
(74) Attorney, Agent, or Firm — Lerner David LLP

(57) ABSTRACT

A battery module includes a plurality of battery cells, and a module case configured to accommodate the plurality of battery cells, the module case being filled with an insulating oil therein to a predetermined height. The insulating oil fills the inside of the module case in an amount covering an entire volume of the battery cells, and the insulating oil is disposed so as to be spaced apart from an inner wall of one side of the module case by a predetermined distance.

7 Claims, 7 Drawing Sheets

(51) Int. Cl.
    *H01M 10/625* (2014.01)
    *H01M 50/24* (2021.01)
    *H01M 50/293* (2021.01)
    *H01M 50/211* (2021.01)

(52) U.S. Cl.
    CPC ......... *H01M 50/211* (2021.01); *H01M 50/24* (2021.01); *H01M 50/293* (2021.01); *H01M 2220/20* (2013.01)

(56) References Cited

U.S. PATENT DOCUMENTS

| | | | |
|---|---|---|---|
| 2014/0087231 A1* | 3/2014 | Schaefer | H01G 4/224 |
| | | | 429/120 |
| 2015/0188203 A1 | 7/2015 | Enomoto et al. | |
| 2016/0126514 A1* | 5/2016 | Suzuki | H01M 50/209 |
| | | | 429/154 |
| 2017/0025664 A1 | 1/2017 | Lim et al. | |
| 2017/0200993 A1 | 7/2017 | Song et al. | |
| 2018/0034116 A1 | 2/2018 | Tajima et al. | |
| 2018/0205124 A1 | 7/2018 | Lee et al. | |
| 2018/0331336 A1* | 11/2018 | Choi | H01M 10/625 |
| 2019/0097287 A1* | 3/2019 | Pflueger | H01M 10/6557 |
| 2019/0229386 A1* | 7/2019 | Scharner | H01M 10/613 |

FOREIGN PATENT DOCUMENTS

| | | |
|---|---|---|
| DE | 102008043306 A1 | 5/2010 |
| DE | 102016004526 A1 | 12/2016 |
| GB | 738110 A | 10/1955 |
| JP | 2001060466 A | 3/2001 |
| JP | 2009512983 A | 3/2009 |
| JP | 2014060088 A | 4/2014 |
| KR | 20130022107 A | 3/2013 |
| KR | 101519241 B1 | 5/2015 |
| KR | 20170010531 A | 2/2017 |
| KR | 20170084606 A | 7/2017 |
| KR | 20170107792 A | 9/2017 |
| KR | 20170132514 A | 12/2017 |
| KR | 20180017695 A | 2/2018 |
| WO | 2013-015360 A1 | 1/2013 |
| WO | WO-2014013981 A1 * | 1/2014 ............ H01M 10/52 |

OTHER PUBLICATIONS

International Search Report for Application No. PCT/KR2019/002331 dated Jun. 28, 2019, 3 pages.
Search Report dated Oct. 24, 2022 from Office Action for Chinese Application No. 201980005189.4 dated Oct. 31, 2022. 3 pgs.
Search Report dated Mar. 21, 2023 from Office Action for Chinese Application No. 201980005189.4 dated Mar. 25, 2023. (see p. 1 categorizing the cited references).

* cited by examiner

BATTERY MODULE, BATTERY PACK INCLUDING SAME BATTERY MODULE, AND VEHICLE INCLUDING SAME BATTERY PACK

CROSS-REFERENCE TO RELATED APPLICATIONS

The present application is a national phase entry under 35 U.S.C. § 371 of International Application No. PCT/KR2019/002331 filed Feb. 26, 2019, which claims priority from Korean Patent Application No. 10-2018-0047843 filed on Apr. 25, 2018, the disclosures of which are incorporated herein by reference.

TECHNICAL FIELD

The present disclosure relates to a battery module, a battery pack including the battery module, and a vehicle including the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attention as a new energy source for its environmental friendliness and energy efficiency, in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module having at least one battery cell first, and then configure a battery pack by using at least one battery module and adding other components.

In the conventional battery module, it is particularly important in terms of overall performance and lifespan to cool the battery module. In the conventional battery module, the battery cells of the battery module are generally cooled using an edge cooling method, which is performed by providing a heat transfer path or the like to the end of the battery cells.

However, in the conventional edge cooling method, a cooling temperature deviation is generated at any one battery cell or between a plurality of battery cells. The cooling temperature deviation is a major factor in reducing the performance of the entire battery module or shortening the life of the battery module.

Therefore, it is required to find a way to improve the cooling temperature deviation of the battery cells when the battery module is cooled.

DISCLOSURE

Technical Problem

The present disclosure is directed to providing a battery module, which may improve the cooling temperature deviation of battery cells when the battery module is cooled, a battery pack including the battery module, and a vehicle including the battery pack.

Technical Solution

In one aspect of the present disclosure, there is provided a battery module, comprising: a plurality of battery cells; and a module case configured to accommodate the plurality of battery cells and filled with an insulating oil therein to a predetermined height, wherein the insulating oil fills the inside of the module case in an amount covering an entire volume of the battery cells and is disposed to be spaced apart from an inner wall of one side of the module case by a predetermined distance.

The battery module may further comprise a plurality of channel guide members respectively disposed between the plurality of battery cells so that facing battery cells are spaced apart from each other by a predetermined distance.

The plurality of channel guide members may form a cooling channel of a lattice shape between the facing battery cells.

The plurality of channel guide members may form at least one cooling channel having a predetermined length along a height direction of the module case between the facing battery cells.

The plurality of channel guide members may be arranged in a zigzag form in a stacking direction of the plurality of battery cells.

The plurality of channel guide members may be made of an elastic pad.

The plurality of channel guide members may have double-sided tapes at surfaces thereof so as to be attached to the facing battery cells, respectively.

The insulating oil may be disposed to be spaced apart from an inner wall of an upper side of the module case by a predetermined distance.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiment.

Advantageous Effects

According to various embodiments as above, it is possible to provide a battery module, which may improve the cooling temperature deviation of battery cells when the battery module is cooled, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease of understanding the present disclosure, the accompanying drawings are not drawn to real scale, but the dimensions of some components may be exaggerated.

Figure 1:
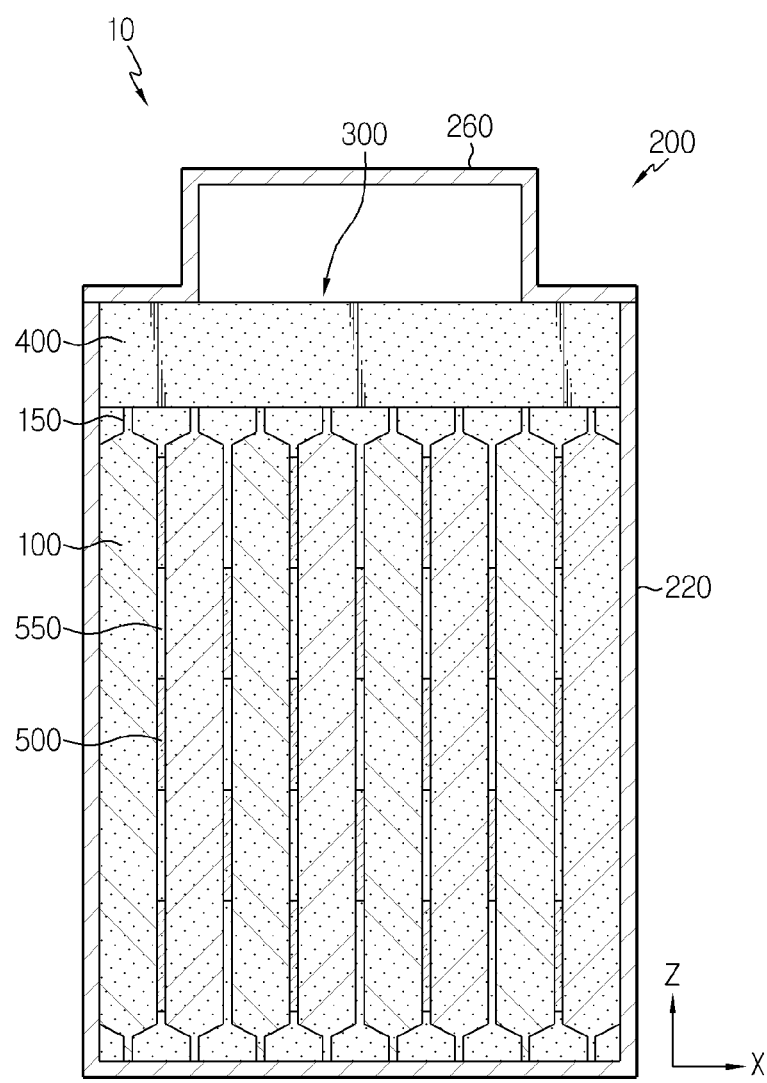
FIG. 1 is a diagram for illustrating a battery module according to an embodiment of the present disclosure.
Figure 2:
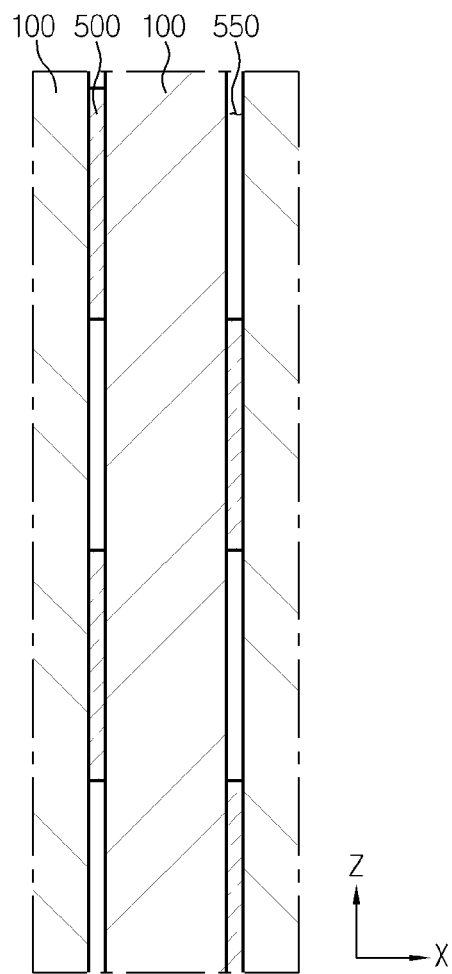
FIGS. 2 and 3 are diagrams for illustrating a channel guide member of the battery module of FIG. 1.
Figure 3:
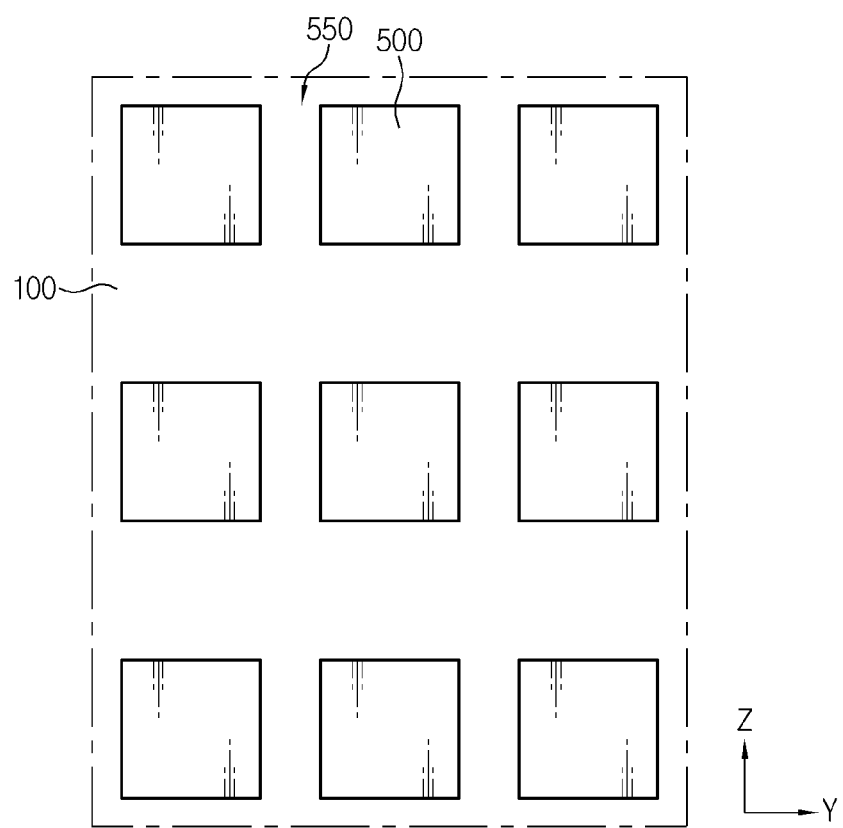
Figure 4:
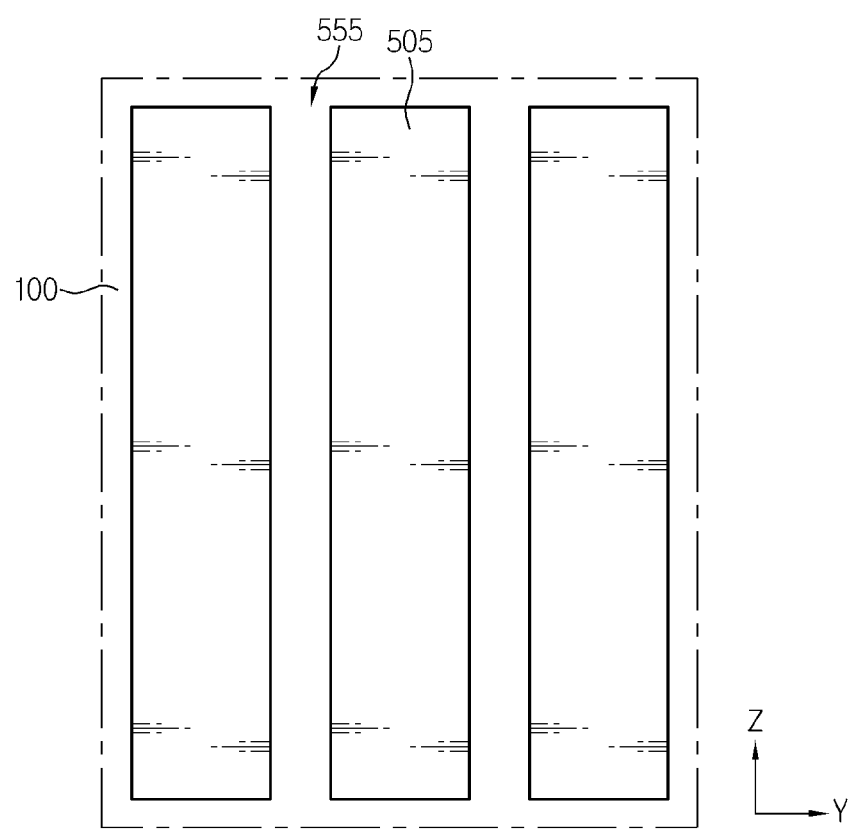
FIG. 4 is a diagram for illustrating a channel guide member according to another embodiment of the battery module of FIG. 1.
Figure 5:
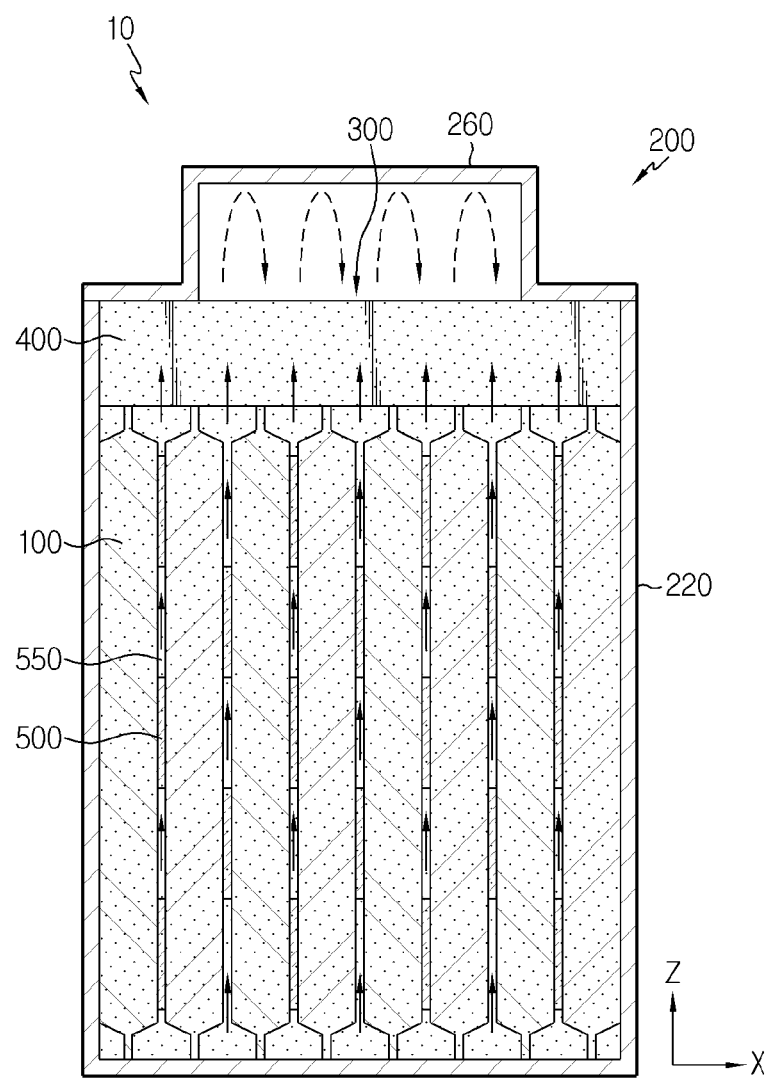
FIGS. 5 and 6 are diagrams for illustrating the flow of an insulating oil in the battery module of FIG. 1.
Figure 6:
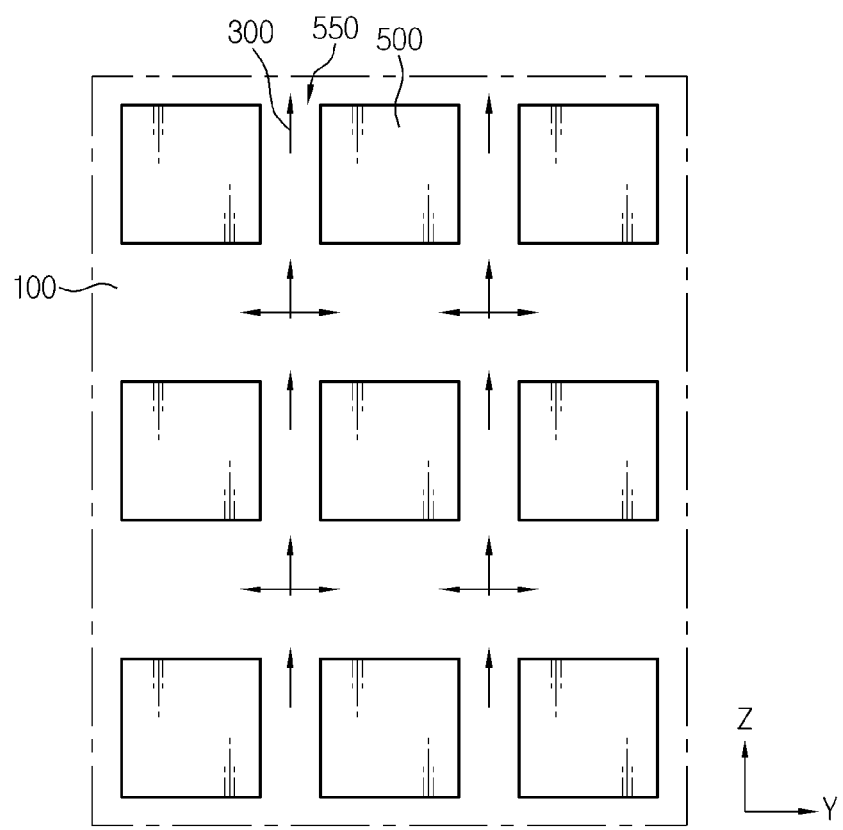

FIG. 1 is a diagram for illustrating a battery module according to an embodiment of the present disclosure, FIGS. 2 and 3 are diagrams for illustrating a channel guide member of the battery module of FIG. 1, FIG. 4 is a diagram for illustrating a channel guide member according to another embodiment of the battery module of FIG. 1, and FIGS. 5 and 6 are diagrams for illustrating the flow of an insulating oil in the battery module of FIG. 1.

Referring to FIGS. 1 to 6, a battery module 10 may include a battery cell 100, a module case 200, an insulating oil 300, a bus bar unit 400, and a channel guide member 500.

The battery cell 100 may be a secondary battery, particularly a pouch-type secondary battery. In addition, the battery cell 100 may also be a cylindrical secondary battery or a rectangular secondary battery.

Hereinafter, in this embodiment, the battery cell 100 will be described as a pouch-type secondary battery.

A plurality of the battery cells 100 may be provided. The plurality of battery cells 100 may be stacked to be electrically connected to each other. Specifically, the plurality of battery cells 100 may be electrically connected to each other through a bus bar unit 400, explained later.

Each of the plurality of battery cells 100 may include an electrode assembly, a battery case for accommodating the electrode assembly, and an electrode lead 150 protruding out of the battery case and connected to the electrode assembly.

The module case 200 accommodates the plurality of battery cells 100 and may package the plurality of battery cells 100. To this end, the module case 200 may have an accommodation space capable of accommodating the plurality of battery cells 100.

The module case 200 may be made of a metal material with high thermal conductivity for effective heat dissipation. As an example, the module case 200 may be made of aluminum.

In addition, the inside of the module case 200 may be filled with an insulating oil 300, explained later, for cooling the plurality of battery cells 100 to a predetermined height.

The module case 200 may include a case body 220 and a case cover 260.

The case body 220 may accommodate the plurality of battery cells 100 and various components of the battery module 10. The case body 220 may be filled with the insulating oil 300, explained later.

The case cover 260 may be coupled to the case body 220 to package the plurality of battery cells 100. Here, the case cover 260 may be coupled to the case body 220 by laser welding or the like.

The insulating oil 300 is for cooling the plurality of battery cells 100 and may be filled in the case body 220 of the module case 200 in an amount covering the entire volume of the plurality of battery cells 100.

The insulating oil 300 may be a liquid material having a high heat capacity. For example, the insulating oil 300 may be a synthetic insulating oil such as a petroleum-based insulating oil, a silicone oil and a chlorinated oil, or a vegetable insulating oil.

Since the insulating oil 300 is filled to cover the entire area of the plurality of battery cells 100, the insulating oil 300 may be in contact with almost all sides of the plurality of battery cells 100. In this embodiment, it is possible to effectively suppress the temperature rise in certain areas of the battery cells 100 by means of the insulating oil 300 that contacts almost all sides of the plurality of battery cells 100.

The insulating oil 300 may be disposed to be spaced apart from an inner wall of one side of the module case 200, specifically an inner wall of an upper side of the case cover 260 of the module case 200, by a predetermined distance. In this case, it is possible to prevent the structural stability of the module case 200 from deteriorating due to expansion of the insulating oil 300 when the temperature is increased due to heat generation of the plurality of battery cells 100.

The bus bar unit 400 is for measuring a voltage or the like of the plurality of battery cells 100 and covers at least one side of the plurality of battery cells 100. The bus bar unit 400 may be electrically connected to the electrode leads 150 of the plurality of battery cells 100.

The channel guide member 500 is for guiding the flow of the insulating oil 300, and a plurality of channel guide members 500 may be provided. The plurality of channel guide members 500 are respectively disposed between the plurality of battery cells 100 and may allow facing battery cells 100 to be spaced by a predetermined distance.

The plurality of channel guide members 500 may be made of an elastic pad having a predetermined elasticity and be attached to the battery case of the plurality of battery cells 100 by an adhesive or the like. For example, the plurality of channel guide members 500 may be made of silicon pads having predetermined elasticity. The present disclosure is not limited thereto, and it is also possible that the plurality of channel guide members 500 are be made of elastic pads of other materials having a predetermined elasticity, which are already commercially available or are to be commercially available.

Meanwhile, the plurality of channel guide members 500 may have double-sided tapes on both surfaces thereof so as to be respectively attached to the battery cases of the facing battery cells 100. Also, the plurality of channel guide members 500 themselves may be made of double-sided tapes with a predetermined thickness so as to be respectively attached to the battery cases of the facing battery cells 100.

The plurality of channel guide members 500 may form a cooling channel 550 of a lattice shape between the facing battery cells 100. The plurality of channel guide members 500 may be arranged in a zigzag form in the stack direction (X-axis direction) of the plurality of battery cells 100.

By means of the plurality of channel guide members 500, the cooling channels 550 may be formed at regular intervals in the spaces between the plurality of battery cells 100. Accordingly, the insulating oil 300 heated while the plurality of battery cells 100 generate heat may be smoothly moved upward by the convection, and the heat exchange may be more uniformly performed between all the battery cells 100.

Thus, when the plurality of battery cells 100 generate heat, the cooling temperature deviation may be substantially not generated between the battery cells 100 disposed at the outermost side and the battery cells 100 disposed near the center.

The shape and arrangement of the plurality of channel guide members 500 are not limited thereto. As shown in FIG. 4, the plurality of channel guide members 505 may also form at least one cooling channel 555 having a predetermined length along the height direction (Z-axis direction) of the module case 200 between the facing battery cells 100.

That is, the plurality of channel guide members may have shapes and arrangements capable of forming other types of cooling channels, as long as the smooth flow of the insulating oil 300 is guided by convection and the cooling temperature deviation of all the battery cells 100 is reduced.

As described above, in this embodiment, the plurality of battery cells 100 are arranged to surround all of the plurality of battery cells 100 so that the cooling temperature deviation of the plurality of battery cells 100 while the plurality of battery cells 100 is cooled may be significantly reduced by means of the insulating oil 300 and the plurality of channel guide members 500 that guide the flow of the insulating oil 300.

Accordingly, in this embodiment, as the cooling temperature deviation of the plurality of battery cells 100 is improved, it is possible to enhance the overall performance and lifetime of the battery module 10.

Figure 7:
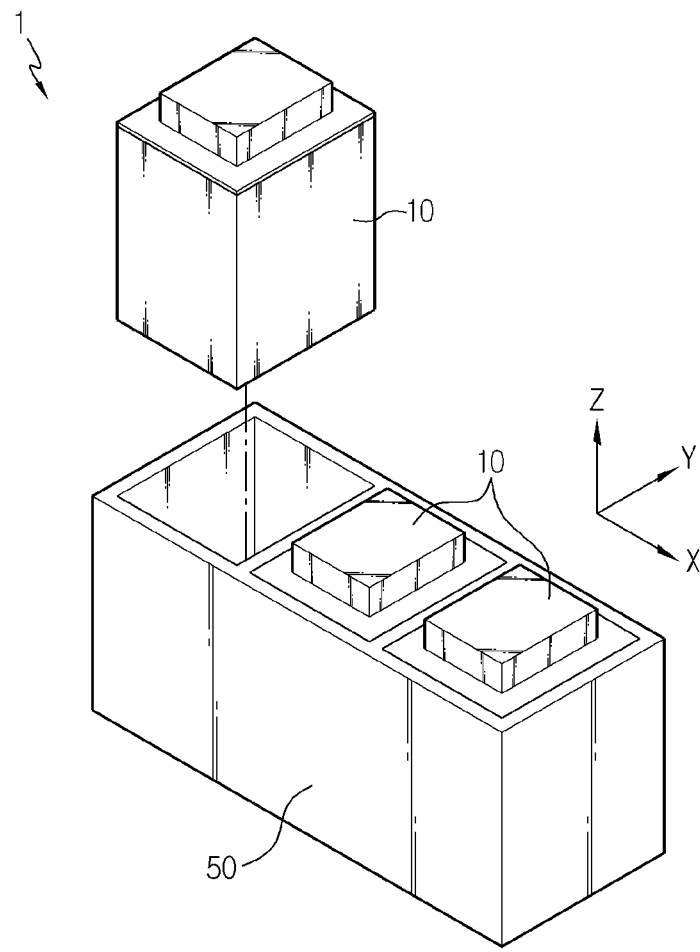
FIG. 7 is a diagram for illustrating a battery pack according to an embodiment of the present disclosure.
Figure 8:
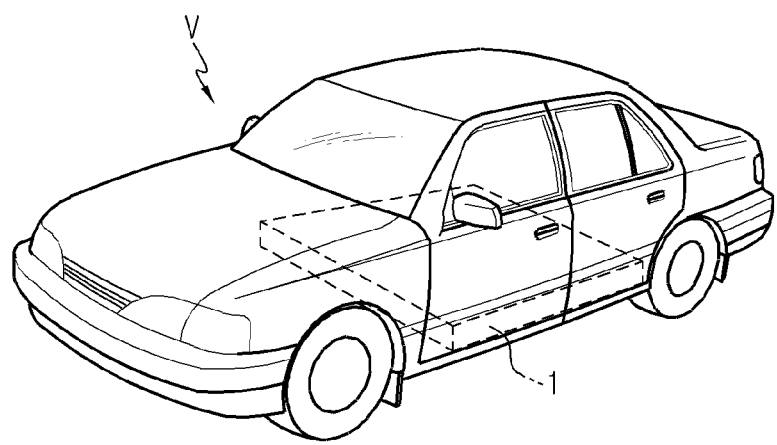
FIG. 8 is a diagram for illustrating a vehicle according to an embodiment of the present disclosure.

FIG. 7 is a diagram for illustrating a battery pack according to an embodiment of the present disclosure, and FIG. 8 is a diagram for illustrating a vehicle according to an embodiment of the present disclosure.

Referring to FIGS. 7 and 8, a battery pack 1 may include at least one battery module 10 according to the former embodiment and a pack case 50 for packaging the at least one battery module 10.

The battery pack 1 may be provided to a vehicle V as a fuel source of the vehicle V. As an example, the battery pack 1 may be provided to an electric vehicle, a hybrid vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as a vehicle V, which have the battery pack 1, include the battery module 10 as described above, and thus it is possible to implement a battery pack 1 having all the advantages of the battery module 10 described above, or devices, instruments, facilities or the like such as a vehicle V, which have the battery pack 1.

According to various embodiments as above, it is possible to provide a battery module 10, which may improve the temperature deviation of battery cells 100 when the battery module 10 is cooled, a battery pack 1 including the battery module 10, and a vehicle V including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a plurality of battery cells stacked along a stacking direction and spaced apart from each other by a predetermined spacing distance along the stacking direction so as to define a respective gap between each facing pair of the plurality of battery cells along the stacking direction;
a plurality of channel guide members disposed in the gaps between the facing pairs of the plurality of battery cells to space apart the facing pairs of the battery cells by the predetermined spacing distance, the plurality of channel guide members defining a cooling channel in each of the gaps between the facing pairs of the plurality of battery cells, and the plurality of channel guide members comprising a plurality of elastic pads, each one of the plurality of elastic pads having opposing first and second surfaces adhered to respective ones of the facing battery cells by an adhesive material, such that the adhesive material is positioned between the first surface and a first one of the facing battery cells and between the second surface and a second one of the facing battery cells; and
a module case configured to accommodate the plurality of battery cells and filled with an insulating oil therein to a predetermined height,
wherein the insulating oil fills the inside of the module case including the cooling channels in an amount covering an entire volume of the battery cells, the insulating oil being disposed so as to be spaced apart from an inner wall of one side of the module case by a predetermined distance, and
wherein the adhesive material adheres each of the plurality of channel guide members to the respective ones of the facing battery cells without extending across the cooling channel, such that the insulating oil in the cooling channel makes direct contact with the facing battery cells
wherein each of the plurality of channel guide members is located at a respective location in a plane orthogonal to the stacking direction, and wherein the locations of the plurality of channel guide members in the plane orthogonal to the stacking direction alternate in successive ones of the gaps along the stacking direction.

2. The battery module according to claim 1,
wherein the cooling channel has a lattice shape.

3. The battery module according to claim 1,
wherein the cooling channel has a predetermined length along a height direction of the module case.

4. The battery module according to claim 1,
wherein the adhesive material is double-sided tape.

5. The battery module according to claim 1,
wherein the one side of the module case from which the insulating oil is spaced apart by the predetermined distance is an upper side of the module case.

6. A battery pack, comprising:
at least one battery module according to claim 1; and
a pack case configured to receive the at least one battery module therein.

7. A vehicle, comprising:
at least one battery pack according to claim 6.

* * * * *